Feb. 8, 1966  H. JACOBS  3,233,664
RECUPERATOR FOR FLUE GASES CONTAINING SINTERABLE DUSTS
Filed Jan. 17, 1961
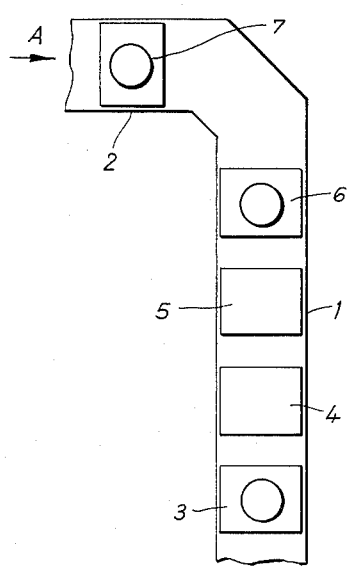
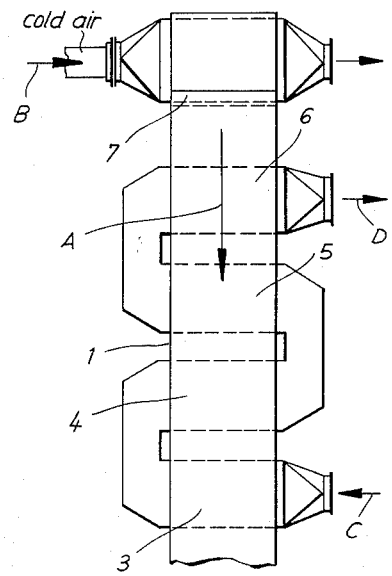
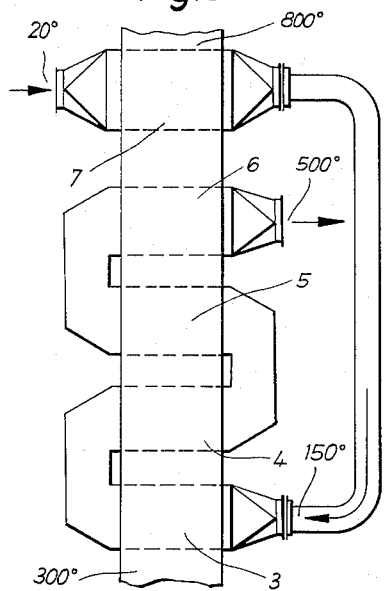
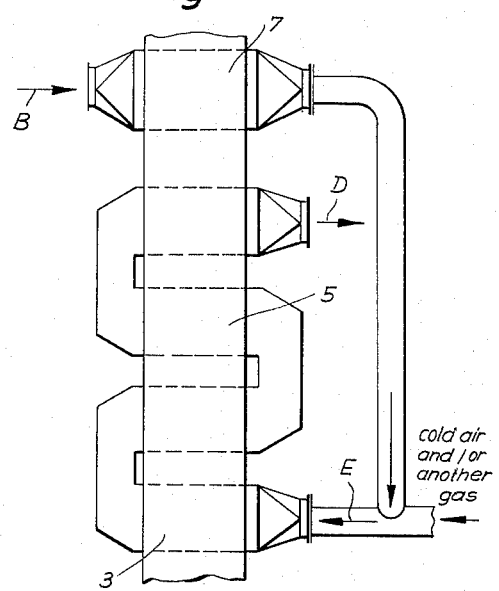
INVENTOR.
Heinz Jacobs
BY

United States Patent Office

3,233,664
Patented Feb. 8, 1966

3,233,664
RECUPERATOR FOR FLUE GASES CONTAINING SINTERABLE DUSTS
Heinz Jacobs, Geldern, Rhineland, Germany, assignor to Industrie-Companie Kleinewefers Konstruktions- und Handelsgesellschaft m.b.H.., Krefeld, Rhineland, Germany
Filed Jan. 17, 1961, Ser. No. 83,267
Claims priority, application Germany, Jan. 19, 1960, J 17,551
1 Claim. (Cl. 165—134)

The present invention relates to a recuperator which may be operated by means of flue gases containing sinterable dusts. When recuperating flue gases with a high content in solid particles, particularly sinterable particles, the heating surfaces of the recuperator are considerably soiled by the collection of sintered particles. This in turn brings about a considerable reduction in the heat conductivity coefficient while simultaneously increasing the flow resistance encountered by the flue gases. The reduction in the heat conductivity coefficient as well as the increase in the flow resistance are undesirable to a high degree because they considerably reduce the efficiency of the recuperator which means that a considerable suction effect has to be produced. In addition thereto, the suction blower is endangered by the higher flue gas temperatures.

In an effort to eliminate or reduce the soiling and the collection of sintered particles, manually operable or automatic cleaning devices have been employed. These manually operable soot blowers, ball blast or chain cleaners do not in all instances bring about the desired effect which can be ascertained particularly when the solid particles have been sintered to the heating surfaces.

It is, therefore, an object of the present invention to provide a recuperator which will overcome the above mentioned drawbacks.

It is another object of this invention to provide a recuperator in which the sinterable dusts or particles of the flue gases will not collect or deposit on the recuperator parts with the drawbacks inherent thereto.

These and other objects and advantages of the invention will appear more clearly from the following specification in connection with the accompanying drawing, in which:

FIG. 1 diagrammatically illustrates a front view of a recuperator system according to the present invention.

FIG. 2 is a diagrammatic side view of the recuperator shown in FIG. 1.

FIGS. 3 and 4 diagrammatically illustrate modifications for the conduction of air in connection with a recuperator according to the present invention.

A recuperator according to the present invention for flue gases with sinterable dusts is characterized primarily in that in the flue gas passage ahead of the recuperator when looking in the direction of flow of the flue gases, there are arranged pre-cooler means operable by cold air and adapted to cool down the sinterable particles below sinter temperature.

According to a practical and advantageous embodiment of the invention, said pre-cooler means, which may also be called pre-cooler group or pre-cooler pipe, may be connected with the recuperator as far as the conduction of air is concerned. This means that first the air to be heated is passed through the pre-cooler group and then passes into the recuperator proper. Prior to entering the recuperator, the air leaving the pre-cooler group or pre-cooler pipe may be admixed with a further quantity of cold air. After the cold air has passed through the pre-cooler group or pre-cooler pipe, it is with or without the addition of further cold air in cross counter flow or in cross direct flow with regard to the direction of flow of the gases passed into the recuperator.

Referring now to the drawing in detail, the high temperature containing flue gases pass through the flue passage 1 in the direction of the arrow A. The flue gas passage may have its upper section formed at an angle with regard to the lower section as illustrated in FIG. 1 at 2. The vertical section of the flue gas passage 1 is passed through by recuperator pipes 3, 4, 5 and 6 as shown in FIG. 2. These recuperator pipes are connected to each other so as to form together a serpentine. Ahead of the recuperator when looking in the direction of flow of the flue gases, there is provided a pre-cooler pipe or precooler group 7 through which cold air passes in the direction of the arrow B. The sinterable dusts of the flue gases will then first hit the wall of the pre-cooler pipe 7 where they are cooled down. After the sinterable dusts have been repelled by the cold walls of the said pre-cooler pipe 7, they impact upon the walls of the recuperator pipe 6 at which time, however, they are cooled down to such an extent that they are not able any longer to sinter. A sintering of the dusts of the flue gases to the pipes 3, 4, 5 and 6 through which the medium to be heated is passed in the direction of the arrows C, D will then not occur any longer.

According to the modification shown in FIG. 3, the medium to be heated, for instance cold air, is passed first through the pre-cooler pipe 7, and subsequently through the recuperator pipes 3, 4, 5 and 6. In this connection the following temperature conditions will be obtained:

When the cold air enters the pre-cooler pipe 7, the air will have a temperature of approximately 20° C.

When entering the recuperator pipe 3, the air temperature will have increased to about 150° C., whereas it will leave the recuperator pipe 6 at a temperature of approximately 500° C.

The flue gas temperatures will when entering the flue gas passage 1, 2 have a temperature of approximately 800° C. and when leaving the flue gas passage will have a temperature of approximately 300° C.

FIG. 4 illustrates a possibility of controlling the quantity of the medium to be heated. By adding cold air to the air pre-heated in the pre-cooler pipe 7, which is indicated by the arrow E, the temperature of the recuperator walls may be varied within certain limits.

It is, of course, to be understood that the present invention is, by no means, limited to the particular constructions shown in the drawing but also comprises any modifications within the scope of the appended claims. Thus, while in connection with the preceding description of the arrangement according to the invention it has been mentioned that the heated up medium enters the recuperator at the lower end thereof (at C in FIG. 2 and at E in FIG. 4), it is also possible to admit the heated up medium into the recuperator at the upper end (D in FIGS. 2 and 4) and to effect the discharge from the recuperator at the lower end (C in FIG. 2 and E in FIG. 4).

What I claim is:

A recuperator system comprising a recuperator and flue gas conduit means leading to said recuperator for flue gases containing sinterable dusts, which includes: precooler means having an air inlet and an air outlet and arranged in and extending laterally through said flue gas conduit means ahead of and in spaced relation to said recuperator when looking in the direction of flow of said flue gas in said flue gas conduit means toward said recuperator, first conduit means for conveying cold air to said inlet of said pre-cooler means for cooling sinterable particles in said flue gas to a temperature below sinter temperature, said recuperator having an air inlet, a second conduit means connecting said outlet of said pre-cooler means to said air inlet of said recuperator, said recuperator comprising a plurality of pipe portions extending laterally through said flue in spaced relation to each other and connected in series, additional conduit means independent of said first conduit means and connected to said second conduit for conveying cooling air thereto independently of the cool air conveyed through said first conduit means for conveying further cold air to said recuperator.

References Cited by the Examiner

UNITED STATES PATENTS 1,430,713  10/1922  Worton _____ 263—45

FOREIGN PATENTS 530,792  12/1940  Great Britain.

ROBERT A. O'LEARY, *Primary Examiner.*

HERBERT L. MARTIN, FREDERICK L. MATTESON, JR., PERCY L. PATRICK, CHARLES SUKALO,
*Examiners.*